Aug. 27, 1929.  W. C. BRINTON  1,725,750
GUARD AND CURTAIN CLOSURE
Original Filed Dec. 31, 1921
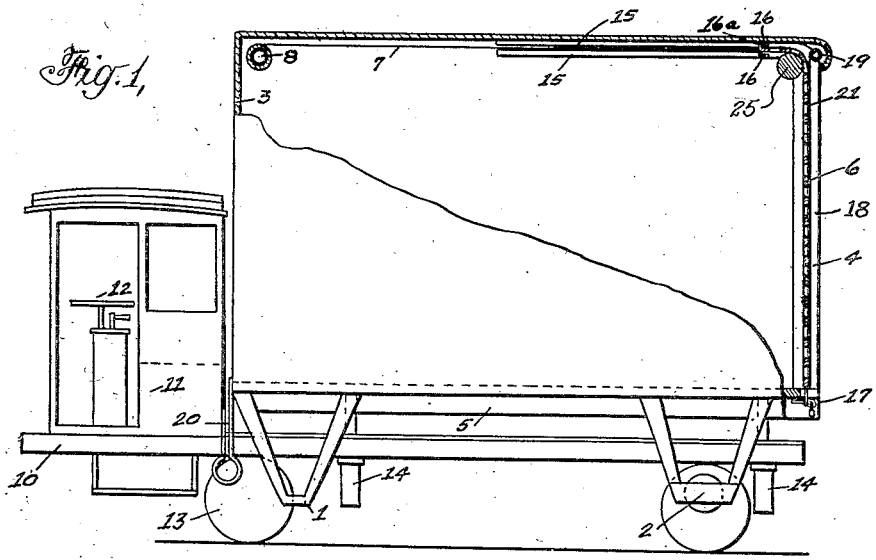
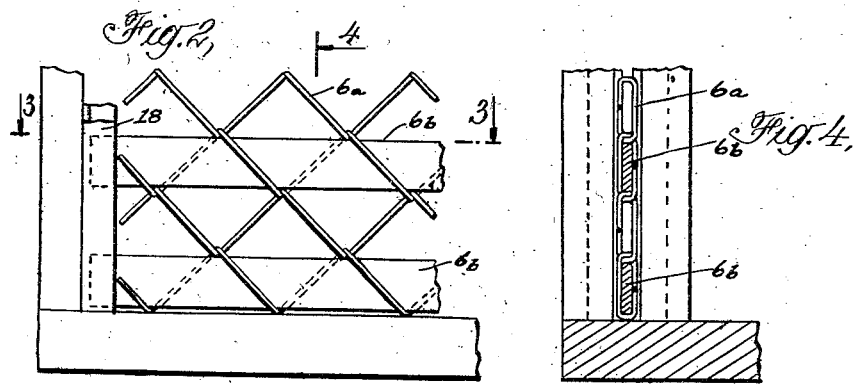
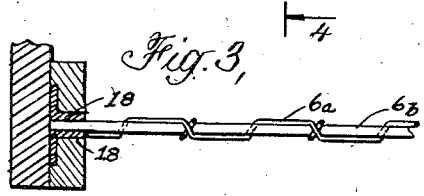
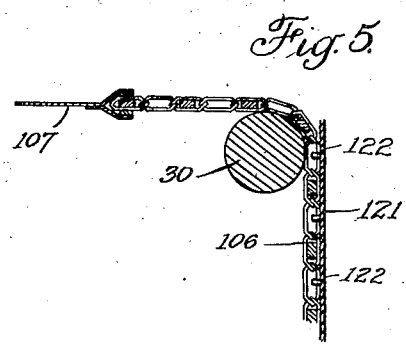
Inventor
Willard C. Brinton
By his Attorney
E. W. Marshall Patented Aug. 27, 1929.

1,725,750

UNITED STATES PATENT OFFICE.

WILLARD C. BRINTON, OF NEW YORK, N. Y., ASSIGNOR TO TERMINAL ENGINEERING COMPANY, INC., OF NEW YORK, N. Y., A CORPORATION OF NEW YORK.

GUARDS AND CURTAIN CLOSURE.

Application filed December 31, 1921, Serial No. 526,285. Renewed January 9, 1929.

My invention relates to guards and curtain closures and particularly to devices of this class used in protecting the contents of trucks, wagons, transfer apparatus, platforms, cupboards, and the like.

An object of my invention is to provide a guard or curtain of the type described which may be readily closed to protect the contents of the vehicle or platform and as readily opened and removed from interference with the handling of the contents.

A further object is to provide means whereby a guard of sufficient strength to protect the contents over which it goes, may still be easily and simply manipulated and as conveniently as the well known window curtain.

Another object is to provide means whereby a guard which is readily opened and closed may be securely fixed in position when closed and thoroughly protect the contents over which it goes.

Other objects relate to ease of construction and repair, low cost of manufacture and installation, neatness of appearance, and ease of placement on new or old vehicles, platforms, wagons, trucks and the like.

With the foregoing and other objects in view which will become apparent as the description proceeds, my invention resides in the combination and arrangement of parts and in the details of construction hereinafter described and particularly pointed out in the appended claims, one preferred embodiment of my invention as a truck body closure being shown in the acompanying drawings, it being understood, however, that I do not limit myself to the precise embodiment of the invention herein disclosed and changes may be made within the scope of what is claimed without departing from the spirit of the invention. I intend no limitations other than those of the claims.

In the drawings Fig. 1 is a side elevation partly of a truck and a body raised thereon and embodying my invention.

Fig. 2 is a fragmentary rear view of a portion of the closure in place.

Fig. 3 is a plan sectional detail on the line 3—3 of Fig. 2.

Fig. 4 is an elevational sectional detail on the line 4—4 of Fig. 2.

Fig. 5 is a sectional elevation of a part of a curtain closure of modified form.

Similar reference characters refer to similar parts throughout the views.

10 represents a lift truck having a cab 11, controls 12, wheels 13, and lifting jacks 14, which I do not attempt to cover in this application.

This type of truck is adapted especially to cooperate with a plurality of load platforms which may be placed wherever convenient for loading and unloading purposes. Such trucks are designed to ride under the platform on the ground or floor, to raise and pick up the platform and to transport it to any desired point, where the platform may be placed by lowering the jacks until it rests on its own legs. The truck may then ride out from under the platform and be free for further operation elsewhere. A spring or other bumper 20 is provided against which the body 3 strikes.

It is highly desirable in many cases that the contents of the load platform be protected from unauthorized interference, handling, or theft. Particularly is this true when the load platform is to be left unattended and, also, when it is to be transported through the public streets, or where the load carried is of great value.

In Fig. 1, 5 is a load platform of the type adapted to cooperate with the lift truck 10. The load platform 5 has a pair of brake legs 1, 1, and a pair of castor legs 2, 2, this castor arrangement providing for ease of moving the platform around manually and the brake legs acting to prevent unintentional movement particularly when the platform rests on a grade or incline.

A covered body frame 3 is built over the platform and affixed thereto, having an unloading and loading end 4 which may be closed by a curtain guard or closure comprising a flexible winding portion 7 and a flexible slatted wire portion 6. In this embodiment a roller 8, preferably spring wound in the usual way, is located at the cab end of the body and acts to roll up flexible portion 7 of the closure and thus raise slatted portion 6 to give access to the body through opening 4.

A pair of guides 15, 15, preferably located at the top of the body act to guide and support slatted portion 6 when the closure is raised. At or adjacent the closure end of guides 15, 15, are lugs 16, 16, against which a stop 16ᵃ on the slatted portion 6 strikes and prevents the curtain closure from being pulled out beyond a predetermined limit sufficient to permit the closure to be drawn taut and locked as at 17.

The slatted portion 6 of the closure preferably comprises a woven wire curtain 6ᵃ formed of interlaced wire rods approximately the width of the opening 4 to be closed (Fig. 2) with transverse slats or rods 6ᵇ inserted between the mesh and projecting beyond the sides of the opening into runways or guides 18 (Fig. 3) to guide the curtain and to strengthen and reinforce the woven wire. The slats 6ᵇ, 6ᵇ, may of course, be spaced closely or as far apart as desired, the degree of spacing affecting the flexibility.

Over the closure may be drawn, if desired, a curtain cover 21 preferably extending to roller 19 at the top of the body opening 4. Such a curtain may be used to protect the contents of the body from the weather or for other purposes.

It will be apparent that with the construction described and the closure drawn down over the guide or roll 25 and locked as at 17, a decided degree of rigidity is provided. The curtain cannot be pushed in or out or moved sideways because of the slats 6ᵇ, 6ᵇ. It cannot be lifted without releasing the lock 17 and cannot be pulled down because of the stop 16ᵃ.

It is further apparent that no strain is put on the flexible portion 7 of the curtain closure which may be of canvas, belting, straps or, in some instances, cord, rope or cable or of any desired nature which may be wound up in comparatively small compass. The slatted portion is preferably not rolled but lies flat at the top of the body, the roller 8 being placed where desired or convenient.

The flexible portion may be secured to the slatted portion by being laced thereto along parallel edges, or in the manner shown at 122 in Fig. 5. In the embodiment of the invention shown in Fig. 5, it will be noted that the layers of the curtain are so secured together, and are passed over a single roller 30, the roller 19 of Fig. 1, thus being dispensed with. The curtain of Fig. 5 comprises an outer layer 121 corresponding to the cover 21 of Fig. 1, and formed of a protective fabric preferably weatherproof; and a slatted layer 106 secured thereto as described, for reinforcing the curtain. The slatted layer 106 corresponds to, and is similar to the slatted portion 6 of Fig. 1.

What I claim is:

1. In a device of the character described, a roller, actuating means for said roller, a winding member carried by said roller, a guard attached to said member, said guard comprising an open wire mesh, transverse guiding members in the interstices of said mesh and tracks arranged to guide opposite ends of said guiding members, and a flexible covering secured to said guard.

2. In a device of the character described, a roller, actuating means for said roller, a winding member carried by said roller, a guard attached to said members, said guard comprising an open wire mesh, transverse guiding members in the interstices of said guard, tracks arranged to guide opposite ends of said guiding members, and means for locking the guard in closed position.

3. In a device of the character described, a roller, actuating means for said roller, a winding member carried by said roller, a guard attached to said member, said guard comprising an open wire mesh, transverse guiding members in the interstices of said guard and tracks arranged to guide opposite ends of said guiding members, a flexible water-proof curtain for covering said guard affixed to the lower edge of said guard, and a roller for said water-proof curtain.

4. A truck body open at one end, a roller mounted on said body, actuating means for said roller, a winding member carried by said roller, a guard attached to said winding member, said guard comprising a series of interlaced bent wire rods, guiding members comprising a series of metallic bars held between said rods and projecting therefrom, tracks on said truck body engaging said projecting ends, a stop to limit the travel of said guard, means for locking the guard in closed position, and a flexible water-proof curtain secured to and covering said guard.

5. A truck body open at one end, a roller mounted on said body, actuating means for said roller, a winding member carried by said roller, a guard attached to said winding member, said guard comprising a series of interlaced bent wire rods, guiding members comprising a series of metallic bars held between said rods and projecting therefrom, tracks on said truck body engaging said projecting ends, a stop to limit the travel of said guard, means for locking the guard in closed position, a flexible waterproof curtain for covering said guard affixed to the lower edge of said guard, and a roller for said flexible curtain.

Signed at New York city in the county of New York and State of New York this 29th day of December, 1921.

WILLARD C. BRINTON.